(12) United States Patent
Judd et al.

(10) Patent No.: US 10,364,747 B2
(45) Date of Patent: Jul. 30, 2019

(54) APPARATUS AND SYSTEM FOR TREATING GASEOUS STREAMS

(71) Applicants: Steven P. Judd, Houston, TX (US); O. Angus Sites, Spring, TX (US)

(72) Inventors: Steven P. Judd, Houston, TX (US); O. Angus Sites, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 353 days.

(21) Appl. No.: 15/340,094

(22) Filed: Nov. 1, 2016

(65) Prior Publication Data

US 2017/0191418 A1 Jul. 6, 2017

Related U.S. Application Data

(60) Provisional application No. 62/273,071, filed on Dec. 30, 2015.

(51) Int. Cl.
| | |
|---|---|
| *F02C 7/14* | (2006.01) |
| *F02C 7/18* | (2006.01) |
| *B01D 53/34* | (2006.01) |
| *F01N 3/34* | (2006.01) |
| *B01D 53/94* | (2006.01) |

(52) U.S. Cl.
CPC ............... *F02C 7/14* (2013.01); *B01D 53/34* (2013.01); *F01N 3/34* (2013.01); *F02C 7/18* (2013.01); *B01D 53/944* (2013.01); *B01D 53/9418* (2013.01); *B01D 2258/01* (2013.01); *F01N 2270/02* (2013.01); *Y02T 10/20* (2013.01)

(58) Field of Classification Search
CPC ............ B01D 53/9418; B01D 53/9422; B01D 53/9427; F01N 3/2066; F01N 3/34; F01N 2470/30; F01N 2270/00; F01N 2270/02; Y02T 10/20; F02K 1/28; F02K 1/36; F02C 3/32
USPC .......................................................... 60/39.5
See application file for complete search history.

(56) References Cited

U.S. PATENT DOCUMENTS

| | | | |
|---|---|---|---|
| 4,142,606 A | 3/1979 | Vanderzanden et al. ..... 181/231 |
| 4,875,436 A * | 10/1989 | Smith ................ B01D 53/8631 |
| | | | 122/7 R |
| 5,424,044 A * | 6/1995 | Kalka ................ B01D 53/8631 |
| | | | 422/171 |
| 6,413,297 B1 | 7/2002 | Morgan et al. .................... 95/22 |
| 8,209,951 B2 * | 7/2012 | Hibshman, II ........ F01K 23/101 |
| | | | 60/39.182 |
| 8,479,501 B2 | 7/2013 | McCarthy, Jr. ................... 60/301 |
| 8,661,799 B2 | 3/2014 | Yacoub et al. .................. 60/320 |

(Continued)

FOREIGN PATENT DOCUMENTS

| | | | |
|---|---|---|---|
| EP | 0717176 | 6/1996 | ............... F01N 3/02 |
| JP | 2012-102684 | 5/2012 | ............. B01D 53/94 |
| WO | 2012/021061 | 2/2012 | ............. F02D 41/02 |

*Primary Examiner* — Steven M Sutherland
(74) *Attorney, Agent, or Firm* — ExxonMobil Upstream Research Company—Law Department

(57) ABSTRACT

The apparatus and systems are for removing contaminants from an exhaust stream. The process may involve passing at least a portion of an exhaust stream through a cooling component, which draws a cooling stream into the cooling component. The cooling stream interacts with the at least a portion of the exhaust stream to form a mixed stream. The resulting mixed stream is a lower temperature than the at least portion of the exhaust stream.

24 Claims, 9 Drawing Sheets

(56) References Cited

U.S. PATENT DOCUMENTS

| | | |
|---|---|---|
| 8,728,412 B2 | 5/2014 | Eiteneer et al. .............. 422/528 |
| 8,931,461 B2 | 1/2015 | Weber et al. ................. 123/568 |
| 2011/0302902 A1* | 12/2011 | Kelly ........................ F01N 3/10 60/39.5 |
| 2013/0074482 A1 | 3/2013 | Okamoto et al. ............... 60/316 |
| 2014/0010748 A1* | 1/2014 | Kim ................... B01D 53/8625 423/239.1 |
| 2014/0123660 A1* | 5/2014 | Stoia ...................... F23R 3/005 60/772 |
| 2015/0338097 A1 | 11/2015 | Beg et al. ....................... 417/53 |
| 2016/0265322 A1 | 9/2016 | Beg |

\* cited by examiner

APPARATUS AND SYSTEM FOR TREATING GASEOUS STREAMS

CROSS REFERENCE TO RELATED APPLICATIONS

This application claims the benefit of U.S. Provisional Patent Application 62/273,071 filed Dec. 30, 2015 entitled APPARATUS AND SYSTEM FOR TREATING GASEOUS STREAMS, the entirety of which is incorporated by reference herein.

FIELD

The present techniques relate to a system and method associated with treating gaseous streams. In particular, the present techniques relate to a method and system for managing the removing contaminants from gaseous streams, such as an exhaust stream, in an enhanced manner.

BACKGROUND

Separation of components in a stream is useful in many industries and can typically be accomplished by physical separations and/or adsorptive separations. The physical separations may involve techniques that separate different states of components in the stream, such as separating gaseous phase from liquid phase and/or from solid phase. For example, a flash separation involves dropping the pressure of a stream and separating the stream into a primarily liquid stream and a primarily gas stream. The adsorptive separations may be based on the differences in equilibrium affinities of the various gas components (e.g., equilibrium separations) or on the differences in adsorption kinetics of gas components (e.g., kinetics separations). As an example, solvents or sorbents may be used to adsorb certain components, while allowing other components to be conducted away with the remaining stream. For gas separations, the separation techniques typically involve separation with sorbents, solvents, membranes and/or cryogenics.

By way of example, hydrocarbon fuels may be combusted to produce various compounds, which may be discharged with the exhaust gas to the atmosphere. In particular, certain references describe the handling of exhaust streams in combustion engines. For instance, U.S. Pat. No. 8,931,461 describes operating an engine system having a sensor coupled to an exhaust gas recirculation system in a motor vehicle. The reference describes a method having two operating conditions. During the first operating condition, at least some exhaust gas from an exhaust of the engine is directed through the exhaust gas recirculation system and past the sensor to an intake of the engine, and, during a second operating condition, at least some fresh air is directed through the exhaust gas recirculation system and past the sensor. In addition, U.S. Pat. No. 8,661,799 describes a configuration for an exhaust stream from an internal combustion engine that passes the exhaust stream through a treatment device arranged in the exhaust line, and a heat source and a heat sink arranged in separate branches of the exhaust line upstream of the treatment device. This is configuration, a device is used to split the exhaust stream into multiple paths to regular flow into a downstream system. Further, Intl. Patent Application Publication No. 2012/021061 describes a system for controlling exhaust gas temperature of an internal combustion engine having a combustion cycle frequency and being provided with an exhaust gas after-treatment device. In this system, air is provided upstream of the combustion chamber, which is used to control the temperature of the exhaust gas. While these references only relate to combustion engines, the references do not appear to address managing the exhaust gas temperature with the induction of air downstream of the combustion or even removing gas components from the exhaust stream.

To limit the gas components provided to the atmosphere, various exhaust treatment techniques and systems are utilized to remove specific components from the exhaust stream prior to discharge to the atmosphere. For example, engine and/or gas turbines may utilize exhaust treatment components and/or systems to remove certain gas components from the exhaust stream. However, the exhaust treating techniques do not typically perform adequately at or above certain temperatures and/or pressures. For example, exhaust treating techniques may have diminished performance if the exhaust stream exceeds a certain threshold temperature. Unfortunately, the threshold temperature may be below the normal temperature of the exhaust stream for certain processes, such as combustion processes.

To adjust the temperature of the exhaust stream, tempering air systems are utilized with exhaust treatment systems to reduce the temperature of the exhaust gas in the exhaust stream to a temperature below the threshold temperature prior to the inlet to the exhaust treating system. The tempering air systems typically utilize fans or blowers to force air into the exhaust system. The forced air is cooler than the exhaust gas in the exhaust stream and is used to dilute the exhaust gas and lower the temperature of the resulting stream. The use of fans and blowers adds complexity to the overall system, are relatively complex to operate and expensive to install and maintain.

For example, certain references describe the handling of exhaust streams in combustion processes. In particular, U.S. Pat. No. 8,728,412 describes a method for reducing the emissions from combustion gases produced during a combustion process. The method includes injecting a hydrocarbon-based reducing agent into the combustion stream, which includes oxides of nitrogen. Then, the combustion or exhaust stream is directed through a selective catalyst reduction (SCR) system to remove oxides of nitrogen from the combustion stream. While the method describes using fans, pumps or flow control equipment as one approach to lower the temperature of the combustion stream, the references indicates that a preferred approach is to use a fast mixing techniques to reduce reducing agent residence time. In addition, U.S. Patent Application Publication No. 2013/074482 describes a method to extract hot exhaust gas from the exhaust stream, which is subsequently used to vaporize aqueous reactive reagents or to provide a heated air process gas mixture. In this method, the reference does not force air into an exhaust system to reduce the temperature, but the exhaust gas is removed from the exhaust stream for treatment.

Accordingly, there remains a need in the industry for apparatus, methods, and systems that provided an enhancements to manage exhaust streams. The present techniques overcomes the drawbacks of conventional tempering air approaches by cooling the exhaust gas in the exhaust stream without fans and blowers (e.g., relying solely on pressure differentials to provide a cooling stream). This present techniques provide a lower capital investment, much smaller equipment foot-print, and lower complexity of the tempering air system, compared to conventional approaches.

SUMMARY OF THE INVENTION

In one embodiment, the present techniques describes a system for managing the removing contaminants from gaseous streams, such as an exhaust stream. The system comprises a combustion system, a tempering air system and an exhaust treatment system. The combustion system produces an exhaust stream. The tempering air system comprises: a housing forming an interior region; one or more cooling components disposed within the interior region, each of the one or more cooling components configured to: receive at least a portion of the exhaust stream; draw a cooling stream based on the at least a portion of the exhaust stream, wherein draw of the cooling stream relies on the Venturi effect and/or Bernoulli's principle based on the velocity of the at least a portion of the exhaust stream; mix the cooling stream with the at least a portion of the exhaust stream to form a mixed stream, wherein the temperature of the mixed stream is lower than the temperature of the at least a portion of the exhaust stream. The exhaust treatment system, which may have an adsorbent material, is configured to receive the mixed stream and to remove one or more contaminants from the mixed stream.

In yet another embodiment, the present techniques describes a process for removing contaminants from an exhaust stream. The process comprises: a) passing at least a portion of an exhaust stream through a cooling component; b) drawing a cooling stream into the cooling component based on the at least a portion of the exhaust stream passing through at least a portion of the cooling component, wherein drawing the cooling stream relies on the Venturi effect and/or Bernoulli's principle based on the velocity of the at least a portion of the exhaust stream; c) mixing the cooling stream with the at least a portion of the exhaust stream to form a mixed stream, wherein the temperature of the mixed stream is less than the temperature of the at least a portion of the exhaust stream; and d) passing the mixed stream to an exhaust treatment system to remove one or more contaminants from the mixed stream.

BRIEF DESCRIPTION OF THE FIGURES

The foregoing and other advantages of the present disclosure may become apparent upon reviewing the following detailed description and drawings of non-limiting examples of embodiments.

DETAILED DESCRIPTION OF THE INVENTION

Figure 1:
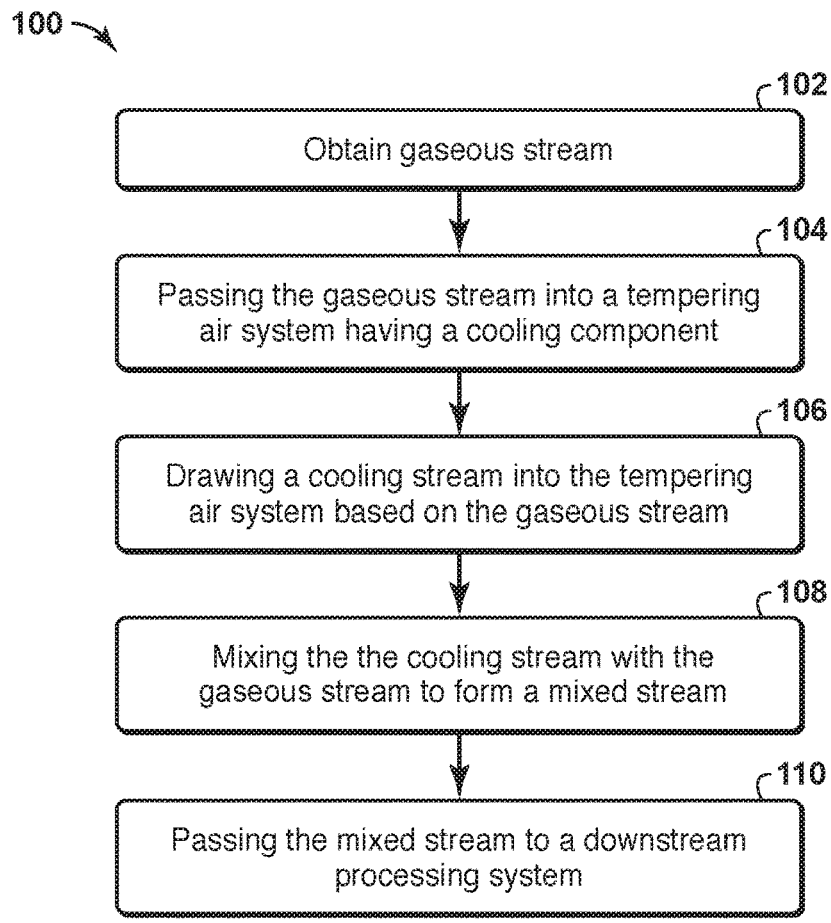
FIG. 1 is a flow diagram of an exemplary method to manage gaseous streams in accordance with an exemplary embodiment of the present techniques.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

As used herein, "stream" refers to fluid (e.g., solids, liquid and/or gas) being conducted through various equipment. The equipment may include conduits, vessels, manifolds, units or other suitable devices.

As used herein, "conduit" refers to a tubular member forming a channel through which something is conveyed. The conduit may include one or more of a pipe, a manifold, a tube or the like.

The term "in direct flow communication" or "in direct fluid communication" means in direct flow communication without intervening valves or other closure means for obstructing flow. As may be appreciated, other variations may also be envisioned within the scope of the present techniques.

The present techniques relate to a system and method associated with treating gaseous streams, which may be from combustion operations or other hydrocarbon processing operations. In particular, the present techniques relate to an enhanced system and method associated with treating gaseous streams, which may involve managing the removal of contaminants from the gaseous stream. The present techniques may lessen the temperature of a gaseous stream (e.g., an exhaust stream) upstream of an adsorbent material without utilizing active mechanical equipment, such as fans and blowers, to provide a cooling stream to the system (e.g., relying solely on pressure differentials to provide a cooling stream). Accordingly, the present techniques provide an enhanced tempering air system, which is utilized with an exhaust treatment systems or other gaseous stream processing systems to manage the temperature of the gaseous stream during the process.

By way of example, the present techniques may provide an enhanced tempering air system, which is utilized with an exhaust treatment system to lessen the temperature of an exhaust stream upstream of an adsorbent material in the exhaust treatment system without utilizing active mechanical equipment, such as fans and blowers. In this configuration, the present techniques utilizes cooling components, such as one or more eductors, to draw the cooling stream into the tempering air system. The cooling component provides the cooling stream by relying on the Venturi effect and/or Bernoulli's principle, which results from the high velocity of the exhaust stream inside a flow passage (e.g., a conduit or duct) to draw the cooling stream (e.g., the outside air) into the tempering air system and to mix with the gaseous stream. While the venture effect implies a restriction (e.g., narrower section) to the flow, Bernoulli's principle applies to gases flowing with high velocity in a straight duct. The high velocity of the gaseous stream creates a localized low pressure region. The cooling stream lessens the temperature of the exhaust stream prior to entering the exhaust treatment system. The present techniques do not utilize fans or blowers to draw the cooling stream into the tempering air system, as the high velocity exhaust stream creates a localized low pressure area (e.g., lower than atmospheric pressure) at the outlet of a nozzle of the cooling component within the exhaust stream. As a result, the cooling stream is drawn from a location external to the cooling component or pushed into the tempering air system. As the exhaust gas in the exhaust stream is at a temperature, which may be a hundred or more degrees higher than the cooling stream, which may be atmospheric air at atmospheric temperatures (e.g., relatively cool compared with the exhaust stream). Beneficially, by using the venture effect in this configuration, no fans or blowers are needed to create a high pressure air stream that is forced into the gaseous stream.

As additional enhancements, the present techniques may include mixing components, temperature sensors and a control system. The mixing components may include plates, baffles or other structural elements that are configured to facilitate mixing of the cooling stream with the exhaust stream. Further, the present techniques may include temperature sensors and a control unit or system to regulate the volume of cooling stream that enters the tempering air system. For example, a control system may include a processor, memory accessible by the processor and a set of instructions stored on the memory that are configured to regulate the volume of cooling stream that enters the tempering air system. The control system may adjust the size of one or more openings in the cooling component (e.g., variable sized openings), the numbers of openings, orientation of the blades, dampers and/or baffles to regulate the volume of cooling stream entering the tempering air system. In addition, the sensors may be used to measure and to obtain the temperature of the exhaust stream at various locations (e.g., upstream of, or within the tempering air system). The sensor may transmit a signal to the control system, which may be configured to increase or decrease the amount of cooling stream entering the tempering air system.

Beneficially, the present techniques provides various enhancements. For example, the configuration lessens the complexity of the equipment by removing the reliance on fans and blowers. Further, the present techniques lessen the costs of the system, by lessening the maintenance expenses, capital expenses and other operational expenses associated the cooling component. In particular, the present techniques utilize a configuration that does not require fans, electric motors, high voltage cabling and switchgear to provide the cooling stream to the tempering air system.

In one or more embodiments, the tempering air system may be used in an exhaust treatment system to reduce or remove one or more components in the exhaust stream, which includes an exhaust gas or flue gas. The exhaust stream may be the byproducts from a combustion process, which involves a gas turbine, a piston engine, a rotary engine, a fired heater or a boiler. The components to be reduced or removed may be any undesired component, but specifically include hydrocarbons, volatile organic compounds, nitrogen oxides, sulfur oxides, ozone, carbon dioxide, carbon monoxide, formaldehyde, hazardous air pollutants or particulate matter.

The exhaust treatment system may include various adsorbent materials to remove the one or more contaminants. By way of example, the exhaust treatment system may be a selective catalytic reduction (SCR) system that converts nitrogen oxides into diatomic nitrogen and water. In this system, a gaseous reductant, such as anhydrous ammonia, aqueous ammonia or urea, may be mixed with the exhaust stream and may be adsorbed onto a catalyst. SCR catalysts are made from various ceramic materials used as a carrier, such as titanium oxide, and active catalytic components, which may be oxides of base metals (e.g., vanadium, molybdenum and tungsten), zeolites, or various precious metals. For the SCR system, the preferred reaction has an optimal temperature range between 356.85° Celsius (C) (630 Kelvin (K)) and 426.85° C. (700 K), but can operate from 226.85° C. (500 K) to 446.85° C. (720 K) with longer residence times. As another example, the exhaust treatment system may be an oxidation catalyst system (e.g., a two-way catalytic convertor), which is configured to convert hydrocarbon and carbon monoxide into water and carbon dioxide. Further, yet another example of an exhaust treatment system may be a non-selective catalyst reduction (NSCR) system (e.g., two-way catalytic convertor). The NSCR system is configured to convert nitrous oxides, hydrocarbon and carbon monoxide to nitrogen, water and carbon dioxide. For the NSCR system, the preferred reaction has an optimal temperature range between 396.85° C. (670 K) and 676.85° C. (950 K), while the oxidation catalyst may operate from 196.85° C. (470 K) to 449.85° C. (723 K).

In one or more embodiments, the method or system of the present techniques may include a tempering air system configured to cool an exhaust stream upstream of an exhaust treatment system. The method for removing contaminants from an exhaust stream may include: passing an exhaust stream through a cooling component; drawing a cooling stream into the cooling component based on the exhaust stream passing through at least a portion of the cooling component (e.g., without utilizing active mechanical equipment); mixing the cooling stream with the exhaust stream to form a mixed stream, wherein the temperature of the mixed stream is less than the temperature of the exhaust stream; passing the mixed stream to an adsorbent material in an exhaust treatment system.

In yet another embodiment, the system may include a cooling component, such as an eductor, coupled to a housing and disposed upstream of an adsorbent material in an exhaust treatment system. The cooling component may be configured to receive at least a portion of the exhaust stream; to draw a cooling stream into the cooling component based on the at least a portion of the exhaust stream passing through the cooling component (e.g., without utilizing active mechanical equipment); to mix the cooling stream with the exhaust stream to form a mixed stream, wherein the temperature of the mixed stream is less than the temperature of the exhaust stream; to pass the mixed stream to an adsorbent material in an exhaust treatment system.

In certain embodiments, the system and method may include various enhancements. For example, one or more sensors (e.g., temperature and/or pressure sensors) may be utilized to obtain measurements for one of the exhaust stream, the cooling stream of the mixed stream at different locations along the flow path of the respective streams. A control unit may be used with the sensors to manage the obtained measurements and adjust the cooling component based on the obtained measurements. Beneficially, the use of the sensors may provide a mechanism to manage the mixed stream temperature to avoid going below the minimum temperature from adding more cooling stream than necessary. Further, by limiting the cooling stream the pressure drop may be managed to reduce unnecessary lowering of the pressure within the system.

To adjust the operating conditions (e.g., pressure, temperature, and/or flow rate), the present techniques may include different equipment and components. For example, the present techniques may include one or more adjustable dampers or valves, which may be installed upstream of the secondary inlet for the cooling component (e.g., suction inlet to the eductor) that lessens or restrict cooling stream from entering the cooling components; and/or actuators that move or adjust the dampers; a control system connected to the sensor (e.g., temperature sensor) and the damper actuators to automatically move the dampers based, at least in part, on the sensor measurements (e.g., temperature and/or pressure); wherein the primary inlet (e.g., nozzle for the primary inlet) for the cooling component has adjustable performance, which may also include actuators that adjust the nozzle; and/or a control system connected to the sensor and the nozzle actuators to adjust (e.g., automatically adjust) the nozzle based, at least in part, on the sensor measurements (e.g., temperatures and/or pressure). The dampers or valves may be operated via a common actuation mechanism.

In other embodiments, the system and method may include additional enhancements. For example, the exhaust treatment system includes one or more of an SCR, oxidation catalyst, NSCR or any combination. In particular, the exhaust treatment system may include an SCR and the SCR reactant is mixed with the cooling stream prior to entering the cooling component (e.g., eductor). The exhaust stream may be from a combustion process, such as a gas turbine, wherein the gas stream entering the SCR is less than 482.22° C. (900° Fahrenheit (F)). Further, the present techniques may include a mixer or mixing component (e.g., static mixer) that may be is used between the cooling component (e.g., eductor) and exhaust treatment system to enhance the mixing of the exhaust stream and the cooling stream; may include perforated sheets, screens, filters and/or other structural elements, which are installed upstream of the secondary inlet for the cooling component.

In one or more embodiments, the cooling component may be one or more gaseous eductors that utilize the Venturi effect and/or Bernoulli's principle. In particular, the eductor may include an injection portion coupled to a suction portion. The injection portion may have a primary inlet, which is a converging-diverging nozzle and a primary outlet, which is direct fluid communication with the suction portion. The suction portion includes a secondary inlet, a secondary outlet and a mixing region formed around the primary outlet of the injection portion. The primary inlet and primary outlet may be configured to receive a gaseous stream and to convert the pressure energy of the gaseous stream passing into velocity energy (e.g., creating a low pressure region within the mixing region of the suction portion) to draw a cooling stream through a secondary inlet (e.g., suction inlet) in the suction portion. After passing through the throat of the primary outlet, the gaseous stream and the cooling stream mix and, as the mixed streams pass through the secondary outlet, the mixed stream expands and the velocity of the mixed stream is reduced. As a result, the mixed stream is recompressed by converting velocity energy into pressure energy after exiting the secondary outlet.

Further, in other embodiments, the present techniques may be adjusted based on the temperatures and pressures used in managing the system. For example, the effectiveness of the cooling component may utilize the ambient temperature of the cooling stream (e.g., air) being drawn into the exhaust system. This may result in more optimum and cost effective applications at low ambient temperature locations. There may also be optimization potential to utilize ancillary systems to cool the ambient air prior to being inducted into the exhaust stream in warm ambient temperatures. The use of ancillary systems to cool the ambient air may include using heat exchangers or other similar systems.

Also, the present techniques may also include various pressures for the gaseous stream and the cooling stream. In particular, the housing of the system may manage the pressure of the gaseous stream and mixed stream between the upstream and downstream systems, which may differ from the external pressure external to the housing, which may be ambient pressures. By way of example, the tempering air system may operate in a range of pressures between 0 pounds per square inch gauge (psig) and 4 psig. For example, the pressure may be based on the preferred gaseous stream pressure, which may be in the range between 0.03 psig and 1 psig, or in the range between 0.14 psig and 0.6 psig. Also, the cooling pressure may be based on the preferred cooling stream pressure, which may be in the range from 0 psig to 0.3 psig and may be measured upstream of the system. However, this system may also operate at other pressures, as well. For example, the housing may be configured to manage an operating pressure for the gaseous stream and the cooling component may obtain a cooling stream at cooling pressure.

The present techniques may be integrated into a various configurations. For example, the tempering air system may include a housing and a cooling component. The housing may include one or more body portions that form a substantially gas impermeable partition between an interior region and locations external to the housing. The cooling component may include various structural elements that manage the flow of fluids into the housing, out of the housing and through the housing. For example, the cooling component may use the structural elements to provide fluid flow passages through openings in the housing between the interior region of the housing and locations external to the interior region of the housing. The configuration of the structural elements may include any variety of patterns or configurations to manage the flow of fluids within the housing and through the housing.

Tempering air processes, apparatus, and systems, as described above, are useful for development and production of hydrocarbons, such as gas and oil processing. Particularly, the provided processes, apparatus, and systems are useful for the rapid, large scale, efficient management of a variety of gaseous streams from various sources, such as combustion systems. In particular, the processes, apparatus, and systems may be used to adjust the temperature of gaseous streams for further processing, such as to remove contaminants from the gaseous stream. The provided processes, apparatus, and systems are useful for preparing gaseous streams for use in utilities, including separation applications. The separation applications may include dew point control; sweetening and/or detoxification; corrosion protection and/or control; dehydration; heating value; conditioning; and/or purification. Examples of utilities that utilize one or more separation applications include generation of fuel gas; seal gas; non-potable water; blanket gas; instrument and control gas; refrigerant; inert gas; and/or hydrocarbon recovery. The present techniques may be further understood with reference to the FIGS. 1 to 10 below.

FIG. 1 is a flow diagram 100 of an exemplary method to manage gaseous streams in accordance with an exemplary embodiment of the present techniques. In this diagram 100, the method may be used to adjust (e.g., lower) the temperature of a gaseous stream without utilizing active mechanical equipment. In particular, the gaseous stream, which may be an exhaust stream, may be passed through a cooling component, which draws a cooling stream into the cooling component based on the gaseous stream passing through at least a portion of the cooling component. This cooling stream may be utilized to adjust the temperature of the gaseous stream for further processing.

The method begins at block 102. In block 102, a gaseous stream is obtained. The gaseous stream may be an exhaust stream or other process stream. The exhaust stream may be produced from a combustion system, such as a turbine, a furnace, a boiler or other combustion system. At block 104, the gaseous stream is passed into a tempering air system having a cooling component. The cooling component may be configured to receive the gaseous stream and to adjust the flow rate and/or pressure of the gaseous stream. This adjustment may involve directing the gaseous stream through fluid flow passages having different cross sectional areas along the flow direction of the cooling component. At block 106, a cooling stream is drawn into the cooling component based on the gaseous stream. The cooling stream may be predominately atmospheric air. The cooling stream may be drawn into the cooling component through pressure differentials without utilizing active mechanical equipment. For example, the cooling stream may be drawn into the cooling component by the passing of the gaseous stream through at least a portion of the cooling component. The configuration of the cooling component may be utilized to form pressure differentials (e.g., use the Venturi effect and/or Bernoulli's principle), which draws the cooling stream into the cooling component. At block 108, the cooling stream is mixed with the gaseous stream to form a mixed stream. The temperature of the mixed stream is different from the temperature of the gaseous stream. For example, the temperature of the cooling stream may be lower than the temperature of the gaseous stream, which results in the mixed stream having a lower temperature than the gaseous stream. Then, at block 110, the mixed stream is passed to a downstream processing system. The downstream processing system may include exhaust treatment system, waste heat recovery systems, filtration system or other suitable treatment system. The exhaust treatment system may include an adsorbent material that is utilized to remove one or more contaminants from the mixed stream.

Figure 2:
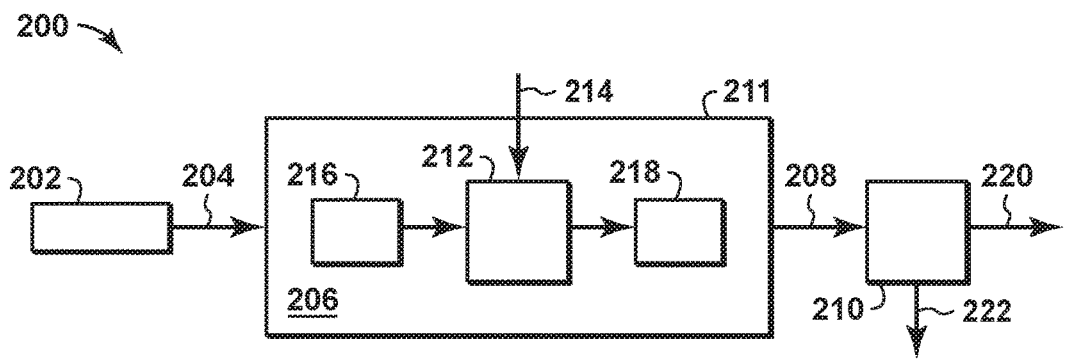
FIG. 2 is a diagram of a gaseous processing system combining various systems and interconnecting piping in accordance with an exemplary embodiment of the present techniques.

FIG. 2 is a diagram of a gaseous processing system 200 combining various systems and interconnecting piping in accordance with an exemplary embodiment of the present techniques. This gaseous processing system 200 includes a gas turbine 202, a tempering air system 206 and an exhaust treatment system 210. The tempering air system 206 is used to process an exhaust stream from the gas turbine 202 to manage the temperature of the stream being provided to the exhaust treatment system 210. While this configuration is a specific example of one configuration, this specific configuration is for exemplary purposes.

In this diagram, the gas turbine 202 provides an exhaust stream to the tempering air system 206 via conduit 204. The tempering air system 206 may include a housing 211 and one or more cooling components, such as cooling component 212. The cooling component 212 is configured to receive the exhaust stream and to draw a cooling stream from conduit 214 into the cooling component 212. The exhaust stream and the cooling stream may be mixed within the cooling component 212 or downstream of the cooling component within the housing 211 of the tempering air system 206. For example, the temperature of the mixed stream may be lower than the temperature of the exhaust stream because the cooling stream is at a lower temperature than the exhaust stream. The amount of cooling stream combined with the exhaust stream may be adjusted to further manage the temperature of the mixed stream. Then, the mixed stream is conducted away from the tempering air system and passed to the exhaust treatment system 210 via conduit 208. The exhaust treatment system 210 may include an adsorbent material and may be configured to adsorb one or more contaminants from the mixed stream to separate the purified stream in conduit 220 from the one or more contaminants in the purge stream in conduit 222. For example, the exhaust treatment system 210 may be a selective catalytic reduction (SCR) system that converts nitrogen oxides into diatomic nitrogen and water.

As an example, the tempering air system 206 may include a housing 211, which may include various body portions, that forms a substantially gas impermeable partition, various components, such as the cooling component, disposed within the housing 211 and a plurality of openings providing fluid flow passages between the interior region of the housing and locations external to the interior region of the housing. Further, the housing may include various structural elements that are configured to provide strength to the tempering air system 206 and to manage the flow of fluids within the tempering air system 206.

In addition, the tempering air system 206 may include other components to manage the flow of fluids through, to, within or from the components within the system. For example, the tempering air system 206 may include one or more flow diverter components, such as flow diverter component 216. The flow diverter component may be configured to divert flow path for the exhaust stream into one of the cooling components. As another example, the tempering air system 206 may include one or more mixing components, such as mixing component 218. The mixing component may be configured to divert the flow of the exhaust stream such that it interacts with the cooling stream, to divert the flow of the cooling stream such that it interacts with the exhaust stream, to divert the flow of the mixed stream such that it interacts with itself or utilize radial mixing, or any combination thereof.

The present techniques provide embodiments to overcome the limitations of relying upon active mechanical equipment to provide a cooling stream for a tempering air system. The present techniques provide various embodiments, which may include different flow profiles to restrict the flow passage from an upstream end to a mid-point and then expand the flow passage from the mid-point to downstream end. In the tempering air system, the cross sectional area as measured along the direction of the stream passing through the respective component may be circular, rectangular, square or other suitable shapes, which may depend on the volume of gaseous stream being provided and the configuration of the upstream and downstream systems. Regardless, the cooling component of the tempering air system may adjust the flow passage to draw the cooling stream by adjusting the cross sectional area along the direction of the stream passing through the cooling component. By way of example, the cross sectional area of the flow passage at the upstream end is larger than the cross sectional area of the flow passage at the mid-point, as measured along the direction of the stream passing through the cooling component. Similarly, the cross sectional area of the flow passage at the mid-point and/or upstream region is smaller than the cross sectional area of the flow passage at the downstream end, as measured along the direction of the stream passing through the cooling component. Accordingly, the body portions of the housing may be adjusted to provide the different flow profiles.

Further, one or more valves may be positioned within the cooling component (e.g., at the midpoint or a location downstream of the midpoint toward the downstream end) to provide the cooling stream. The valves may include butterfly valves, ball valves, gate valves, dampers or other suitable flow control mechanisms, which are configured to manage the flow of fluids through an opening. The positioning of these flow control mechanisms may be adjusted for the different flow profiles. The one or more flow control mechanisms may provide the cooling stream by relying on the pressure differentials, which is based on the high velocity of the gaseous stream inside the flow passage.

Figure 3:
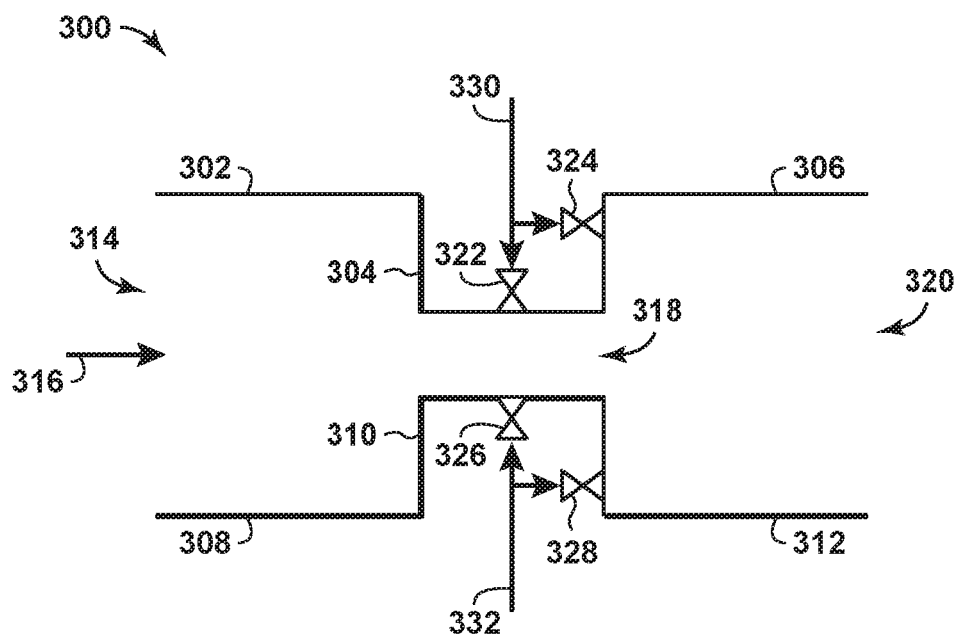
FIG. 3 is an exemplary cross sectional diagram of cooling component in accordance with an embodiment of the present techniques.

By way of example, FIG. 3 is an exemplary cross sectional diagram 300 of a cooling component in accordance with an embodiment of the present techniques. In this configuration, the cross sectional diagram is shown along the length of the flow path and includes the body portions 302, 304, 306, 308, 310 and 312 that form the housing, which includes a rectangular region that constricts the flow of fluid through the cooling component. The body portions 302, 304, 308 and 310 for the upstream region 314 near the upstream end of the cooling component. The upstream region 314 is an internal region that receives the gaseous stream (e.g., exhaust stream), which flows in the direction shown by the arrow 316 from the upstream end to the mid-point. Following the upstream region 314, the constricted region 318 is formed by the body portions 304 and 310, which includes the mid-point. The gaseous stream flows from the upstream region 314 to the constricted region 318. Following the constricted region 318, the downstream region 320 is formed by the body portions 304, 306, 310 and 312, which includes the downstream end of the cooling component. This is the portion of the cooling component that the stream exits.

Further, various valves, such as valves 322, 324, 326 and 328, may be used to control the cooling stream into the constricted region 318 and the exit region 320. The cooling stream may be provided from conduit 330 for valves 322 and 324 and from conduit 332 for valves 326 and 328. The valves 322 and 326 may be positioned at the mid-point of the cooling component, while the valves 324 and 328 may be positioned downstream of the mid-point toward the downstream end.

Figure 4:
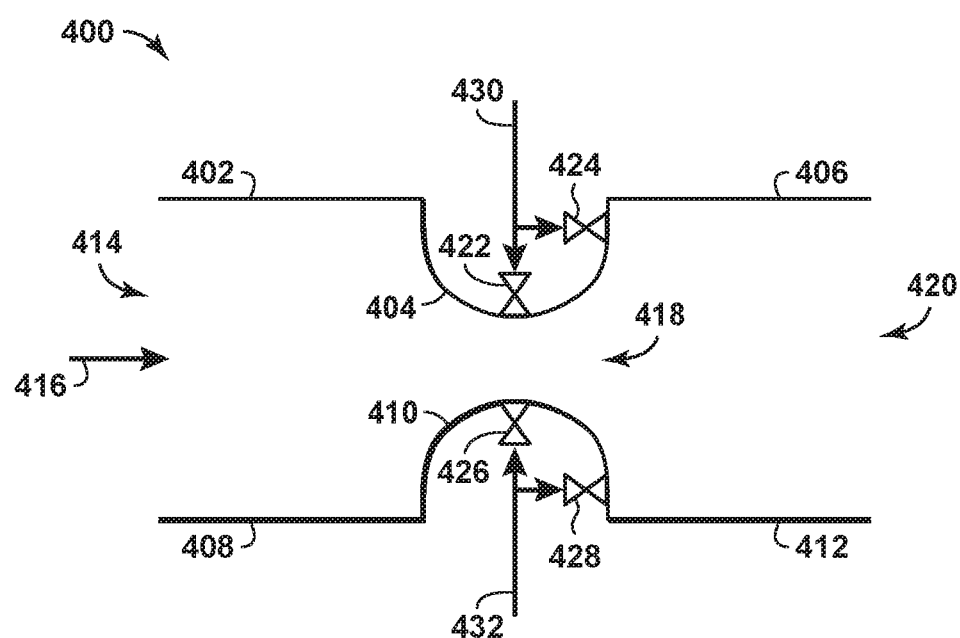
FIG. 4 is an alternative exemplary cross sectional diagram of a cooling component in accordance with an embodiment of the present techniques.

As another example, FIG. 4 is an alternative exemplary cross sectional diagram 400 of a cooling component in accordance with an embodiment of the present techniques. In this configuration, the cross sectional diagram is shown along the length of the flow path and includes the body portions 402, 404, 406, 408, 410 and 412 that form the housing, which includes a semi-circular region that constricts the flow of fluid through the cooling component. The body portions 402, 404, 408 and 410 for the upstream region 414. The upstream region 414 is an internal region that receives the gaseous stream (e.g., exhaust stream), which flows in the direction shown by the arrow 416. Following the upstream region 414, the constricted region 418 is formed by the body portions 404 and 410. The gaseous stream flows from the upstream region 414 to the constricted region 418. Following the constricted region 418, the downstream region 420 is formed by the body portions 404, 406, 410 and 412.

Further, various valves, such as valves 422, 424, 426 and 428, may be used to provide the cooling stream into the constricted region 418 and the exit region 420. The cooling stream may be provided from conduit 430 for valves 422 and 424 and from conduit 432 for valves 426 and 428. The valves 422 and 426 may be positioned at the mid-point of the cooling component, while the valves 424 and 428 may be positioned downstream of the mid-point toward the downstream end.

Figure 5A:
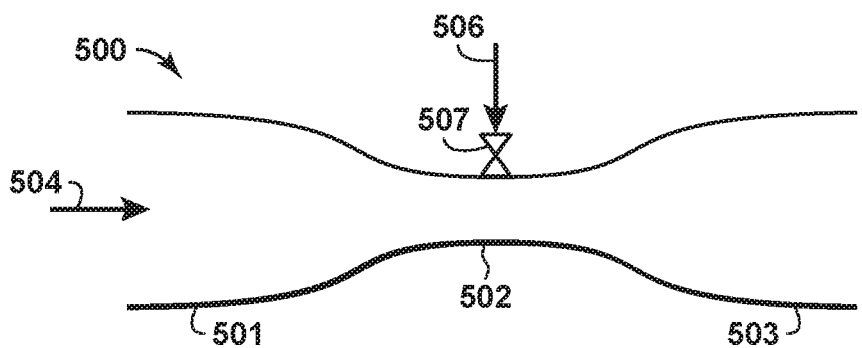
FIG. 5A to 5F are additional alternative exemplary cross sectional diagrams of a cooling component in accordance with an embodiment of the present techniques.

FIG. 5A to 5F are additional alternative exemplary cross sectional diagrams 500, 510, 520, 530, 540 and 550 of a cooling component in accordance with an embodiment of the present techniques. These additional cross sectional diagrams 500, 510, 520, 530 and 540 are shown along the length of the flow path. For example, FIG. 5A is a cross sectional diagram 500 of an embodiment that provides a less turbulent transition for the stream within the cooling component. In this diagram 500, various body portions 501, 502 and 503 form the housing, which includes a constricted region that restrict the flow of fluid through the cooling component. The body portion 501 forms the upstream region near the upstream end of the cooling component, while the body portion 502 forms the constricted region, which includes the mid-point, and the body portion 503 forms the downstream region. The upstream region receives the gaseous stream (e.g., exhaust stream), which flows in the direction shown by the arrow 504 from the upstream end through the constricted region to the downstream end. This diagram 500 also includes a valve 507, which may be positioned at the mid-point and used to control the cooling stream into the constricted region from the conduit 506.

Figure 5B:
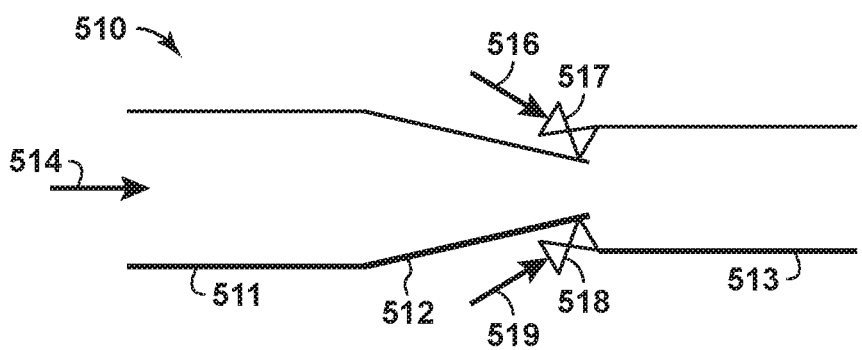

As another example, FIG. 5B is a cross sectional diagram 510 of another embodiment for the cooling component. In this diagram 510, various body portions 511, 512 and 513 form the housing, which includes a constricted region that restrict the flow of fluid through the cooling component. The body portion 511 forms the upstream region near the upstream end of the cooling component, while the body portion 512 forms the constricted region, which includes the mid-point, and the body portion 513 forms the downstream region. The upstream region receives the gaseous stream (e.g., exhaust stream), which flows in the direction shown by the arrow 514 from the upstream end through the constricted region to the downstream end. This diagram 510 also includes valves 517 and 518, which may be positioned near the mid-point and used to control cooling streams into the constricted region from the respective conduit 516 and 519. In this configuration, the valves 517 and 518 are disposed slightly downstream of the mid-point toward the downstream end.

Figure 5C:
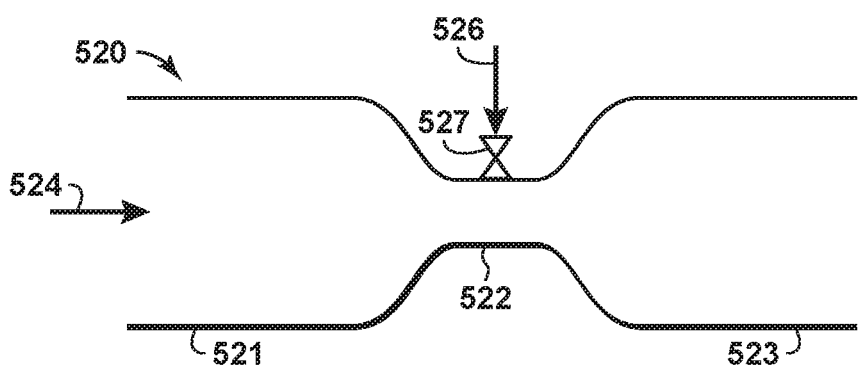

Further, FIG. 5C is yet another a cross sectional diagram 520 of embodiment for the cooling component. In this diagram 520, various body portions 521, 522 and 523 form the housing, which includes a constricted region that restrict the flow of fluid through the cooling component. The body portion 521 forms the upstream region near the upstream end of the cooling component, while the body portion 522 forms the constricted region, which includes the mid-point, and the body portion 523 forms the downstream region. The upstream region receives the gaseous stream (e.g., exhaust stream), which flows in the direction shown by the arrow 524 from the upstream end through the constricted region to the downstream end. This diagram 520 also includes a valve 527, which may be positioned near the mid-point and used to control the cooling stream into the constricted region from the conduit 526. In this configuration, the valve 527 is slightly downstream of the mid-point.

Figure 5D:
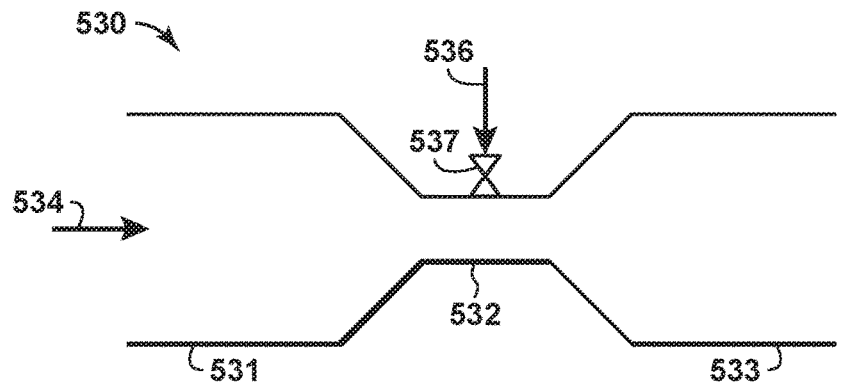

Further still, FIG. 5D is yet another a cross sectional diagram 530 of embodiment for the cooling component. In this diagram 530, various body portions 531, 532 and 533 form the housing, which includes a constricted region that restrict the flow of fluid through the cooling component. The body portion 531 forms the upstream region near the upstream end of the cooling component, while the body portion 532 forms the constricted region, which includes the mid-point, and the body portion 533 forms the downstream region. The upstream region receives the gaseous stream (e.g., exhaust stream), which flows in the direction shown by the arrow 534 from the upstream end through the constricted region to the downstream end. This diagram 530 also includes a valve 537, which may be positioned at the mid-point and used to control the cooling stream into the constricted region from the conduit 536. In this configuration, the valve 537 is slightly downstream of the mid-point.

Figure 5E:
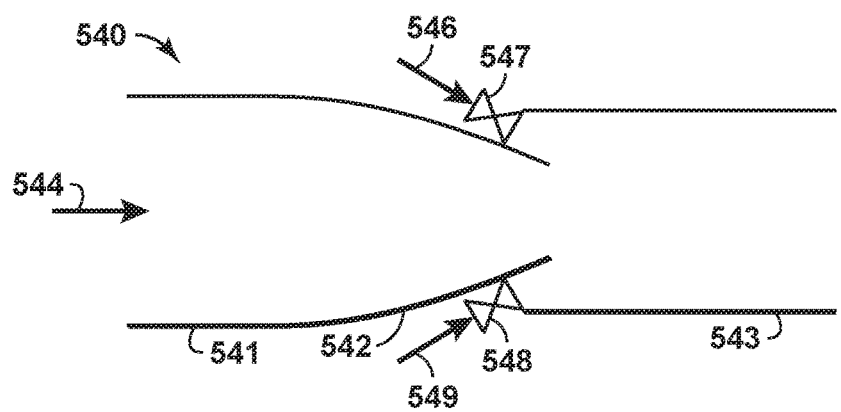

As yet another example, FIG. 5E is a cross sectional diagram 540 of another embodiment for the cooling component. In this diagram 540, various body portions 541, 542 and 543 form the housing, which includes a constricted region that restrict the flow of fluid through the cooling component. The body portion 541 forms the upstream region near the upstream end of the cooling component, while the body portion 542 forms the constricted region, which includes the mid-point, and the body portion 543 forms the downstream region. The upstream region receives the gaseous stream (e.g., exhaust stream), which flows in the direction shown by the arrow 544 from the upstream end through the constricted region to the downstream end. This diagram 540 also includes valves 547 and 548, which may be positioned near the mid-point (e.g., at a location slightly downstream of the midpoint) and used to control cooling streams into the constricted region from the respective conduits 546 and 549. In this configuration, the valves 547 and 548 are slightly downstream of the mid-point.

Figure 5F:
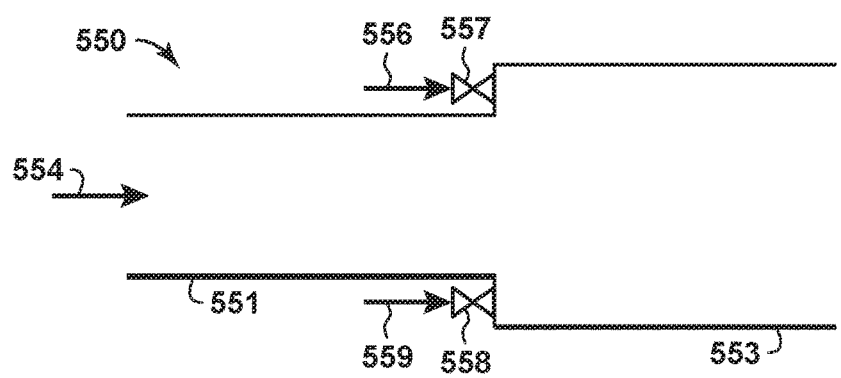

Moreover, FIG. 5F is a cross sectional diagram 550 of another embodiment for the cooling component. In this diagram 550, various body portions 551 and 553 form the housing, which includes larger downstream region than the upstream region in the cooling component. The body portion 551 forms the upstream region near the upstream end of the cooling component, while the body portion 553 forms the downstream region near the downstream end. The upstream region receives the gaseous stream (e.g., exhaust stream), which flows in the direction shown by the arrow 554 from the upstream end to the downstream end. This diagram 550 also includes valves 557 and 558, which may be positioned at the mid-point (e.g., between the downstream region and the upstream region) and used to control the cooling stream into the downstream region from the conduit 556 and 559, respectively. In this configuration, the valves 557 and 558 are slightly downstream of the mid-point.

Figure 6A:
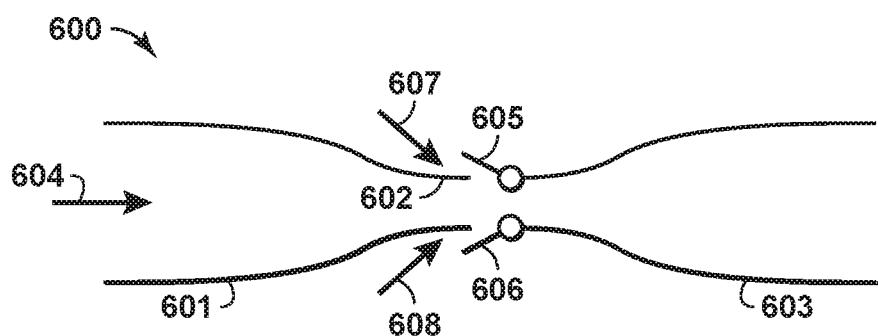
FIG. 6A to 6F are further alternative exemplary cross sectional diagrams of a cooling component in accordance with an embodiment of the present techniques.

FIG. 6A to 6F are further alternative exemplary cross sectional diagrams 600, 610, 620, 630, 640 and 650 of a cooling component in accordance with an embodiment of the present techniques. These additional cross sectional diagrams 600, 610, 620, 630, 640 and 650 are shown along the length of the flow path. For example, FIG. 6A is a cross sectional diagram 600 of an embodiment that utilizes rotating or pivoting dampers to manage the cooling stream within the cooling component. In this diagram 600, various body portions 601, 602 and 603 form the housing, which includes a constricted region that restrict the flow of fluid through the cooling component. The body portion 601 forms the upstream region near the upstream end of the cooling component, while the body portion 602 forms the constricted region and the body portion 603 forms the downstream region. The upstream region receives the gaseous stream (e.g., exhaust stream), which flows in the direction shown by the arrow 604 from the upstream end through the constricted region to the downstream end. This diagram 600 also includes two dampers, first damper 605 and second damper 606, which may be positioned at the mid-point and used to control the cooling streams into the constricted region from the respective conduits 607 and 608. The dampers 605 and 606 may by controlled by individual actuators or a single actuator (not shown).

Figure 6B:
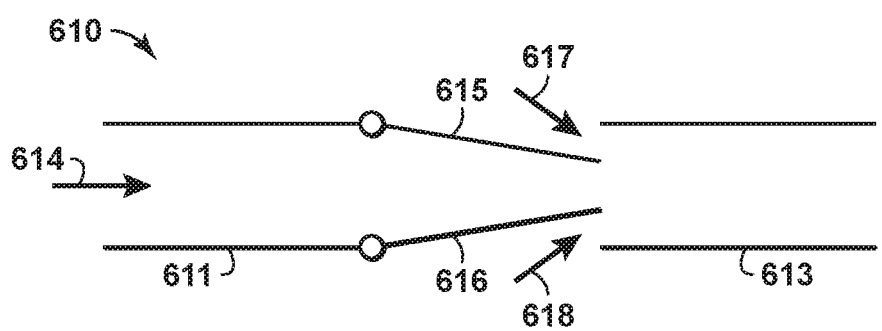

As another example, FIG. 6B is a cross sectional diagram 610 of an embodiment that provides an alternative rotating damper configuration. In this diagram 610, various body portions 611 and 613 form the housing, which includes a constricted region that restrict the flow of fluid through the cooling component. The body portion 611 forms the upstream region near the upstream end of the cooling component, while the body portion 613 forms the downstream region. The upstream region receives the gaseous stream (e.g., exhaust stream), which flows in the direction shown by the arrow 614 from the upstream end through the constricted region to the downstream end. This diagram 610 also includes two dampers, first damper 615 and second damper 616, which may be positioned at the mid-point and used to control the cooling streams into the constricted region from the respective conduits 617 and 618. The dampers 615 and 616 may by controlled by individual actuators or a single actuator (not shown).

Figure 6C:
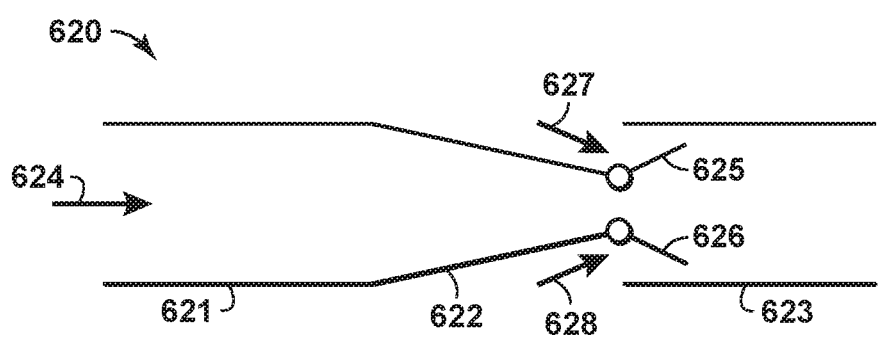

As yet another example, FIG. 6C is a cross sectional diagram 620 of an embodiment that provides an alternative rotating damper configuration. In this diagram 620, various body portions 621, 622 and 623 form the housing, which includes a constricted region that restrict the flow of fluid through the cooling component. The body portion 621 forms the upstream region near the upstream end of the cooling component, while the body portion 622 forms the constricted region and the body portion 623 forms the downstream region. The upstream region receives the gaseous stream (e.g., exhaust stream), which flows in the direction shown by the arrow 624 from the upstream end through the constricted region to the downstream end. This diagram 620 also includes two dampers, first damper 625 and second damper 626, which may be positioned at the mid-point and used to control the cooling streams into the constricted region from the respective conduits 627 and 628. The dampers 625 and 626 may by controlled by individual actuators or a single actuator (not shown).

Figure 6D:
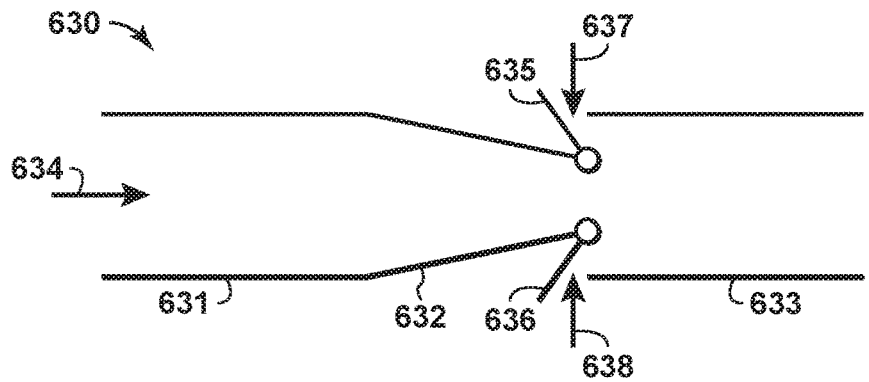

Further, FIG. 6D is a cross sectional diagram 630 of an embodiment that provides yet another alternative rotating damper configuration. In this diagram 630, various body portions 631, 632 and 633 form the housing, which includes a constricted region that restrict the flow of fluid through the cooling component. The body portion 631 forms the upstream region near the upstream end of the cooling component, while the body portion 632 forms the constricted region and the body portion 633 forms the downstream region. The upstream region receives the gaseous stream (e.g., exhaust stream), which flows in the direction shown by the arrow 634 from the upstream end through the constricted region to the downstream end. This diagram 630 also includes two dampers, first damper 635 and second damper 636, which may be positioned at the mid-point and used to control the cooling streams into the constricted region from the respective conduits 637 and 638. The dampers 635 and 636 may by controlled by individual actuators or a single actuator (not shown).

Figure 6E:
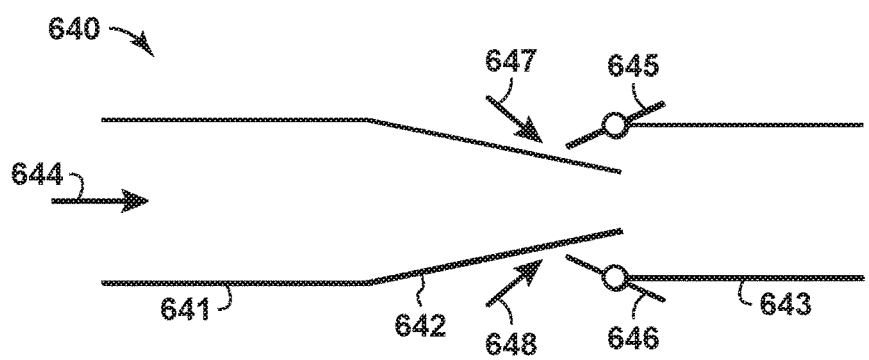

Further still, FIG. 6E is a cross sectional diagram 640 of an embodiment that provides an additional alternative rotating damper configuration. In this diagram 640, various body portions 641, 642 and 643 form the housing, which includes a constricted region that restrict the flow of fluid through the cooling component. The body portion 641 forms the upstream region near the upstream end of the cooling component, while the body portion 642 forms the constricted region and the body portion 643 forms the downstream region. The upstream region receives the gaseous stream (e.g., exhaust stream), which flows in the direction shown by the arrow 644 from the upstream end through the constricted region to the downstream end. This diagram 640 also includes two dampers, first damper 645 and second damper 646, which may be positioned at the mid-point and used to control the cooling streams into the constricted region from the respective conduits 647 and 648. The dampers 645 and 646 may by controlled by individual actuators or a single actuator (not shown).

Figure 6F:
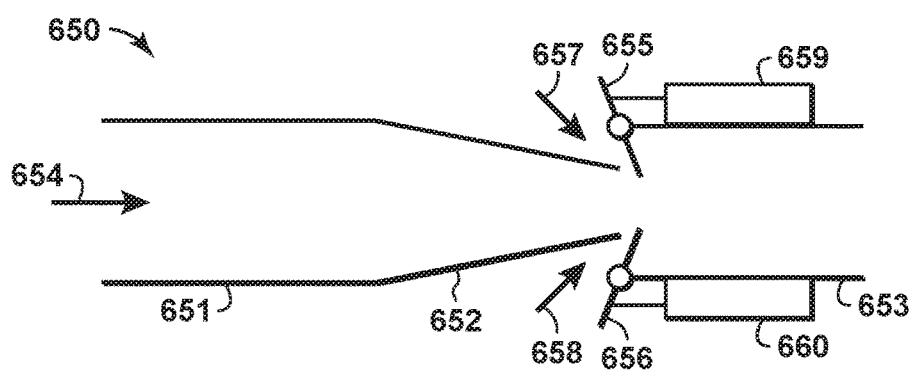

Moreover, FIG. 6F is a cross sectional diagram 650 of an embodiment that provides an alternative rotating damper configuration. In this diagram 650, various body portions 651, 652 and 653 form the housing, which includes a constricted region that restrict the flow of fluid through the cooling component. The body portion 651 forms the upstream region near the upstream end of the cooling component, while the body portion 652 forms the constricted region and the body portion 653 forms the downstream region. The upstream region receives the gaseous stream (e.g., exhaust stream), which flows in the direction shown by the arrow 654 from the upstream end through the constricted region to the downstream end. This diagram 650 also includes two dampers, first damper 655 and second damper 656, which may be positioned at the mid-point and used to control the cooling streams into the constricted region from the respective conduits 657 and 658. The first damper 655 may be controlled by first actuator 659 and the second damper 656 may be controlled by second actuator 660. In other embodiments, the dampers 655 and 656 may by controlled by multiple actuators or a single actuator (not shown).

Figure 7A:
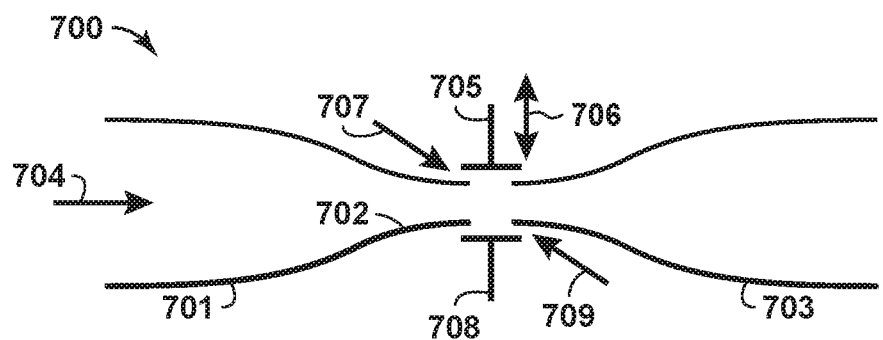
FIG. 7A to 7D are further alternative exemplary cross sectional diagrams of a cooling component in accordance with an embodiment of the present techniques.

FIG. 7A to 7D are further alternative exemplary cross sectional diagrams 700, 710, 720 and 730 of cooling components in accordance with an embodiment of the present techniques. These additional cross sectional diagrams 700, 710, 720 and 730 are shown along the length of the flow path. For example, FIG. 7A is a cross sectional diagram 700 of an embodiment that utilizes sliding dampers to manage the cooling stream within the cooling component. In this diagram 700, various body portions 701, 702 and 703 form the housing, which includes a constricted region that restrict the flow of fluid through the cooling component. The body portion 701 forms the upstream region near the upstream end of the cooling component, while the body portion 702 forms the constricted region and the body portion 703 forms the downstream region. The upstream region receives the gaseous stream (e.g., exhaust stream), which flows in the direction shown by the arrow 704 from the upstream end through the constricted region to the downstream end. This diagram 700 also includes two dampers, first sliding damper 705 and second sliding damper 708, which may be positioned at the mid-point in the constricted region and may be used to control the cooling streams into the constricted region from the respective conduits 707 and 709. The dampers 705 and 708 may by controlled by individual actuators or a single actuator (not shown) may move as shown by the arrow 706.

Figure 7B:
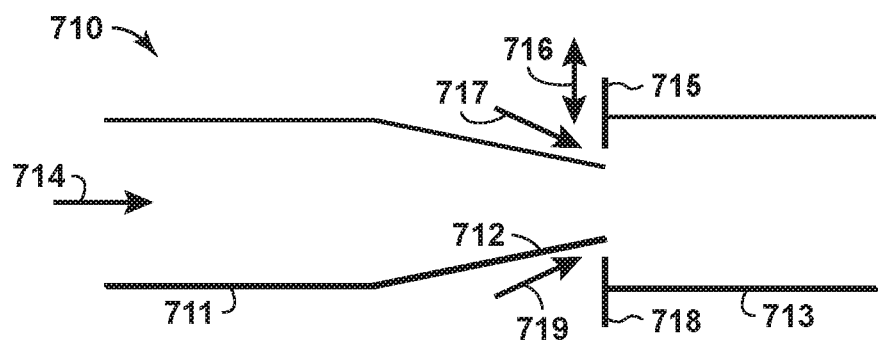

As another example, FIG. 7B is a cross sectional diagram 710 of an embodiment that utilizes sliding dampers to manage the cooling stream within the cooling component. In this diagram 710, various body portions 711, 712 and 713 form the housing, which includes a constricted region that restrict the flow of fluid through the cooling component. The body portion 711 forms the upstream region near the upstream end of the cooling component, while the body portion 712 forms the constricted region and the body portion 713 forms the downstream region. The upstream region receives the gaseous stream (e.g., exhaust stream), which flows in the direction shown by the arrow 714 from the upstream end through the constricted region to the downstream end. This diagram 710 also includes two dampers, first sliding damper 715 and second sliding damper 718, which may be positioned at the mid-point in the constricted region and may be used to control the cooling streams into the constricted region from the respective conduits 717 and 719. The dampers 715 and 718 may by controlled by individual actuators or a single actuator (not shown) may move as shown by the arrow 716.

Figure 7C:
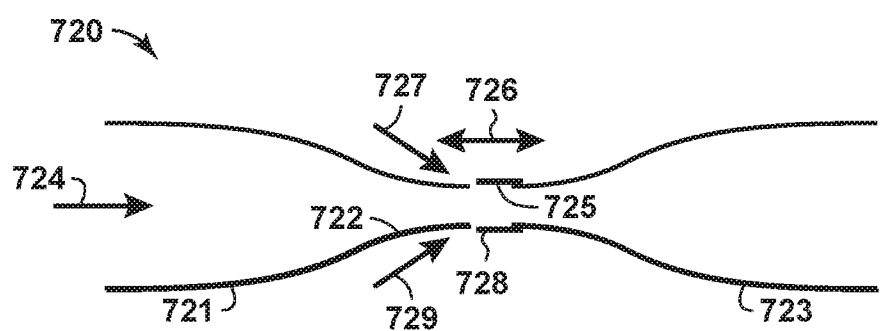

As yet another example, FIG. 7C is a cross sectional diagram 720 of an embodiment that utilizes sliding dampers to manage the cooling stream within the cooling component. In this diagram 720, various body portions 721, 722 and 723 form the housing, which includes a constricted region that restrict the flow of fluid through the cooling component. The body portion 721 forms the upstream region near the upstream end of the cooling component, while the body portion 722 forms the constricted region and the body portion 723 forms the downstream region. The upstream region receives the gaseous stream (e.g., exhaust stream), which flows in the direction shown by the arrow 724 from the upstream end through the constricted region to the downstream end. This diagram 720 also includes two dampers, first sliding damper 725 and second sliding damper 728, which may be positioned at the mid-point in the constricted region and may be used to control the cooling streams into the constricted region from the respective conduits 727 and 729. The dampers 725 and 728 may by controlled by individual actuators or a single actuator (not shown) may move as shown by the arrow 726.

Figure 7D:
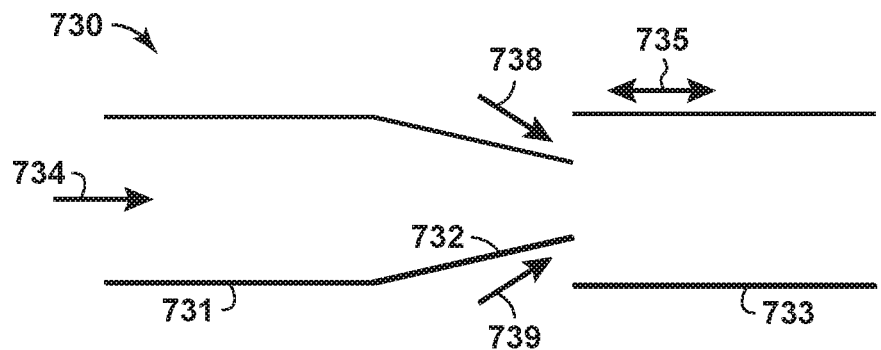

As yet another example, FIG. 7D is a cross sectional diagram 730 of an embodiment that utilizes sliding dampers to manage the cooling stream within the cooling component. In this diagram 730, various body portions 731, 732 and 733 form the housing, which includes a constricted region that restrict the flow of fluid through the cooling component. The body portion 731 forms the upstream region near the upstream end of the cooling component, while the body portion 732 forms the constricted region and the body portion 733 forms the downstream region. The upstream region receives the gaseous stream (e.g., exhaust stream), which flows in the direction shown by the arrow 734 from the upstream end through the constricted region to the downstream end. In this diagram 730, the body portion 733 slides to restrict or expand flow as shown by arrow 735. The opening provided for the respective cooling streams 738 and 739 may be positioned at the mid-point in the constricted region and may be downstream of the constricted region. The body portion 733 may by moved by an actuator (not shown).

Figure 8:
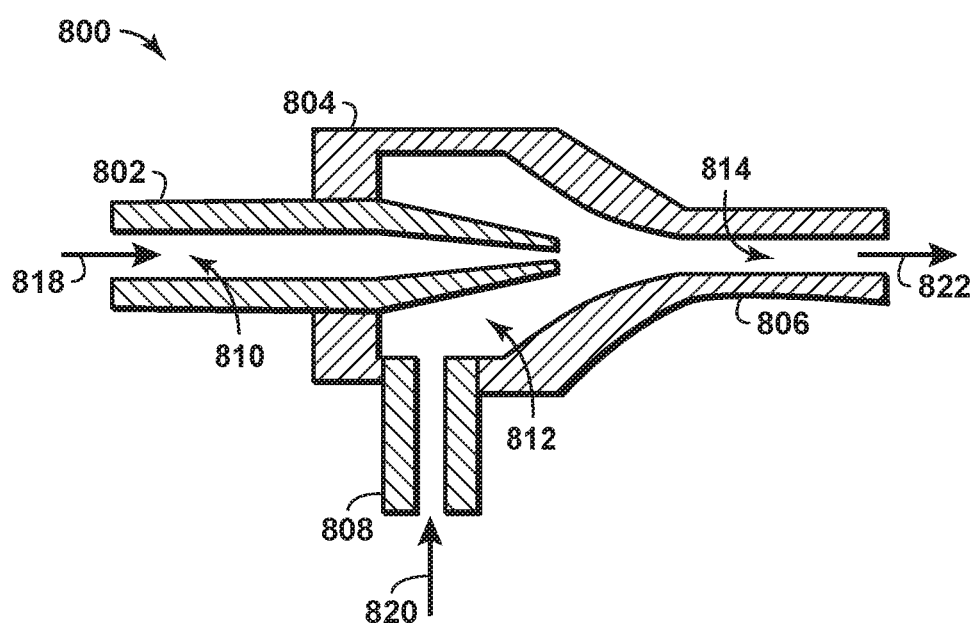
FIG. 8 is yet another alternative exemplary cross sectional diagram of a cooling component in accordance with an embodiment of the present techniques.

As yet another example, FIG. 8 is yet another alternative exemplary cross sectional diagram 800 of a cooling component in accordance with an embodiment of the present techniques. In this configuration, the body portions 802, 804, 806 and 808 form the housing. The body portion 802 forms the initial region 810, which receives the gaseous stream. The body portion 804 forms the mixing region 812 with the body portion 802. The body portion 806 forms the exit region 814. Finally, the body portion 808 forms the passage for the cooling stream into the mixing region 812. The initial region 810 is an internal region that receives the gaseous stream (e.g., exhaust stream), which flows in the direction shown by the arrow 818. Following the initial region 810, the gaseous stream is passed into the mixing region 812 and is combined with cooling stream in this region. The cooling stream flows in the direction shown by the arrow 820. The resulting mixed stream is passed through the exit region 814 along the flow in the direction shown by the arrow 822.

Figure 9:
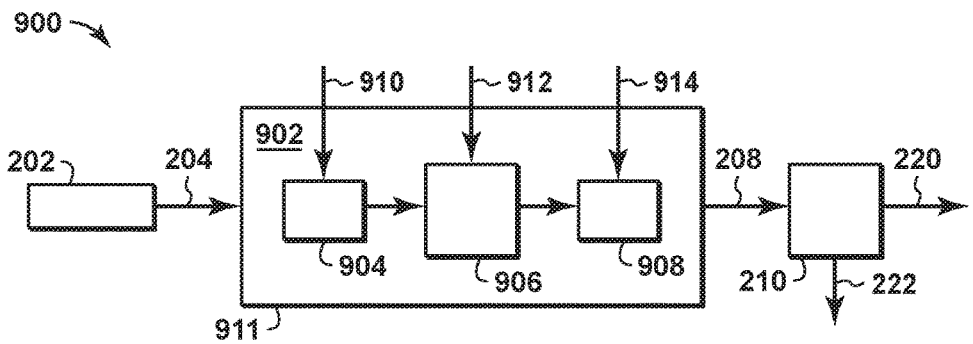
FIG. 9 is another diagram of a gaseous processing system combining various systems and interconnecting piping in accordance with an exemplary embodiment of the present techniques.

In yet another configuration, FIG. 9 is another diagram of a gaseous processing system 900 combining various systems and interconnecting piping in accordance with an exemplary embodiment of the present techniques. This gaseous processing system 900 includes a gas turbine 202, a tempering air system 902 and an exhaust treatment system 210. While the gas turbine 202, the tempering air system 902 and the exhaust treatment system 210 may operate, as discussed above in FIG. 2, the tempering air system 902 in this configuration may include two or more cooling components coupled in series with each other. While this configuration is a specific example of one configuration, this specific configuration is for exemplary purposes.

In this diagram, the gas turbine 202 provides an exhaust stream to the tempering air system 206 via conduit 204. The tempering air system 902 may include a housing 211 and three or more cooling components, such as cooling components 904, 906 and 908. The cooling components 904, 906 and 908 may be in fluid communication with each other in series and may be configured to receive the input stream and to draw a cooling stream from the respective conduits 910, 912 and 914 into the respective cooling component 904, 906 and 908. The respective input streams are mixed with a different cooling stream in each of the cooling component 904, 906 and 908 or downstream of the respective cooling component within the housing 911. For example, the temperature of the resulting mixed stream may be lower than the temperature of the input stream because the cooling stream is at a lower temperature than the input stream. Depending on the desired amount of cooling, one or more of the cooling components may be bypassed or may have the cooling stream blocked to further manage the temperature of the mixed stream. Then, the mixed stream is conducted away from the tempering air system 902 and passed to the exhaust treatment system 210 via conduit 208.

In yet another embodiment, one or more of the cooling components may be operated in parallel. For example, the gaseous stream may be passed into the tempering air system and distributed into two or more cooling components in parallel to manage the adjustments of the temperature of the stream. Each of the two or more cooling components may pass a portion of the gaseous stream through the respective cooling component. Further, as yet another example, two or more of the cooling components operated in parallel may also be used with other cooling components configured in series.

As a further enhancement, the tempering air system may be used with a control unit and one or more sensors to manage the cooling components. The one or more sensors may be distributed along the flow path and communicate with the control unit, which may also communicate with control devices associated with the cooling components. The control devices may be used to restrict or limit the cooling stream being combined with the gaseous stream passing through the cooling component.

Figure 10:
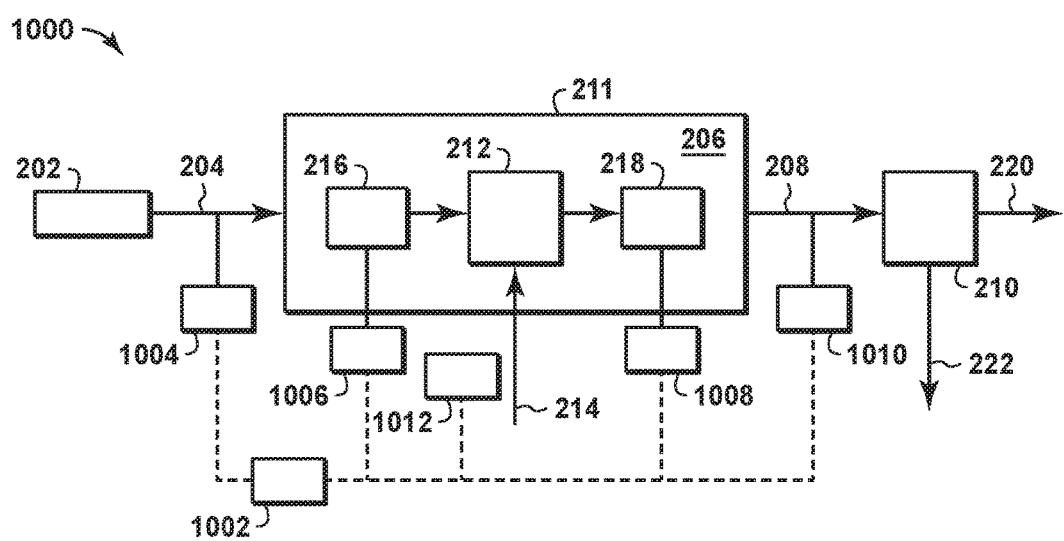
FIG. 10 is another diagram of a gaseous processing system combining various systems and interconnecting piping and using control components to manage the operation in accordance with an exemplary embodiment of the present techniques.

For example, FIG. 10 is another diagram 1000 of a gaseous processing system combining various systems and interconnecting piping and using control components to manage the operation in accordance with an exemplary embodiment of the present techniques. This gaseous processing system 1000 includes a gas turbine 202, a tempering air system 206 and an exhaust treatment system 210. While the gas turbine 202, the tempering air system 206 and the exhaust treatment system 210 may operate, as discussed above in FIG. 2, the control components, such as control unit 1002, sensors 1004, 1006, 1008 and 1010, and regulator 1012, may be used to manage the operation of the system. While this configuration is a specific example of one configuration, this specific configuration is for exemplary purposes.

In this diagram, the control unit 1002 may communicate with sensors 1004, 1006, 1008 and 1010, and regulator 1012, as shown by the dashed lines. The sensors 1004, 1006, 1008 and 1010 may obtain temperature measurements at various locations along the process. The different measurements may be used by the control unit 1002 to determine the adjustments to the regulator 1012. The regulator may be used to adjust the amount of cooling stream provided to the cooling component.

As an example, during operation mode, the control unit 1002 may communicate with the sensor 1010. Based on the temperature data, the control unit 1002 may transmit a notification to the regulator 1012, which adjusts the volume of cooling stream to maintain the measured temperature of the stream between a first set of user-defined thresholds (e.g., low and high temperature set points). Further, the control unit 1002 may communicate with the sensor 1004 during operation mode. Based on the temperature data, the control unit 1002 may transmit a notification to the regulator 1012, which adjusts the volume of cooling stream to maintain the measured temperature of the stream between a second set of user-defined thresholds (e.g., low and high temperature set points). In addition, during start-up or shut-down mode, the sensors 1006 and 1008 may also be utilized to further manage the temperature of the stream.

As another example, during operation mode, the control unit, such a control unit 1002, may communicate with the sensors, such as sensor 1010. In this configuration, the system may include one or more sensors configured to measure temperature; an actuator configured to receive a control signal and based on the control signal value adjust the flow rate of cooling stream drawn into one of the one or more cooling components; a control unit in communication with the one or more sensors and the actuator; wherein the control unit is configured to: obtain temperature measurements from the one or more sensors; transmit a control signal to the actuator to maintain the temperature within a desired range.

Persons skilled in the technical field will readily recognize that in practical applications of the disclosed methodology, it is partially performed on a computer, typically a suitably programmed digital computer. Further, some portions of the detailed descriptions which follow are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "processing" or "computing", "calculating", "comparing", "determining", "displaying", "copying," "producing," "storing," "adding," "applying," "executing," "maintaining," "updating," "creating," "constructing" "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present techniques also relate to an apparatus for performing the operations herein. This apparatus may be specially constructed for the required purposes, or it may comprise a general-purpose computer selectively activated or reconfigured by a computer program stored in the computer (e.g., one or more sets of instructions). Such a computer program may be stored in a computer readable medium. A computer-readable medium includes any mechanism for storing or transmitting information in a form readable by a machine (e.g., a computer). For example, but not limited to, a computer-readable (e.g., machine-readable) medium includes a machine (e.g., a computer) readable storage medium (e.g., read only memory ("ROM"), random access memory ("RAM"), magnetic disk storage media, optical storage media, flash memory devices, etc.), and a machine (e.g., computer) readable transmission medium (electrical, optical, acoustical or other form of propagated signals (e.g., carrier waves, infrared signals, digital signals, etc.)).

Furthermore, as will be apparent to one of ordinary skill in the relevant art, the modules, features, attributes, methodologies, and other aspects of the present techniques can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

Further, one or more embodiments may include methods that are performed by executing one or more sets of instructions to perform the monitoring of the temperatures in various stages of the process. For example, the method may include executing one or more sets of instructions to perform comparisons between thresholds current statuses or indications along with transmitting data between modules, components and/or sensors.

As an example, the control unit may be a computer system, which may be utilized and configured to implement on or more of the present aspects. The computer system may include a processor; memory in communication with the processor; and a set of instructions stored on the memory and accessible by the processor, wherein the set of instructions, when executed, are configured to: receive a transmitted signal from the sensors and regulator; determine a temperature from the transmitted signal; provide one or more of a visual indication and audible notification associated with the temperature, if a change in temperature has occurred; and store the updated status in memory.

The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined by the appended claims.

What is claimed is:

1. A system for managing the removing contaminants from gaseous streams, such as an exhaust stream, the system comprising:
   a combustion system producing an exhaust stream;
   a tempering air system comprising:
      a housing forming an interior region;
      one or more cooling components disposed within the interior region, each of the one or more cooling components configured to:
         receive at least a portion of the exhaust stream;
         draw a cooling stream based on the at least the portion of the exhaust stream, wherein draw of the cooling stream relies on the Venturi effect and/or Bernoulli's principle based on a velocity of the at least the portion of the exhaust stream;
         mix the cooling stream with the at least the portion of the exhaust stream to form a mixed stream, wherein a temperature of the mixed stream is lower than a temperature of the at least the portion of the exhaust stream; and
   an exhaust treatment system configured to receive the mixed stream and to remove one or more contaminants from the mixed stream, and further comprising:
   one or more sensors configured to measure temperature, wherein one of the one or more sensors is disposed between the one or more cooling components and the exhaust treatment system;
   a regulator configured to adjust a volume of cooling stream drawn into one of the one or more cooling components;
   a control unit in communication with the one or more sensors and the regulator; wherein the control unit is configured to:
      obtain temperature measurements from the one or more sensors:
      determine whether the temperature measurements are within a threshold; and transmit a notification to the regulator to adjust the volume of cooling stream drawn into one of the one or more cooling components.

2. The system of claim 1, wherein the cooling stream is predominately atmospheric air.

3. The system of claim 1, wherein the one or more cooling components comprise two or more cooling components configured to operate in parallel with each other.

4. The system of claim 1, wherein the one or more cooling components comprises a first cooling component and a second cooling component configured to operate in series with each other, wherein the first cooling component is configured to:
receive the at least the portion of the exhaust stream;
draw a first cooling stream based on the at least the portion of the exhaust stream;
mix the first cooling stream with the at least the portion of the exhaust stream to form a first mixed stream, wherein a temperature of the first mixed stream is lower than a temperature of the at least a portion of the exhaust stream; and
the second cooling component is configured to:
receive at least the portion of the first mixed stream;
draw a second cooling stream based on the at least the portion of the first mixed stream;
mix the second cooling stream with the at least the portion of the first mixed stream to form a second mixed stream, wherein a temperature of the second mixed stream is lower than the temperature of the at least the portion of the first mixed stream.

5. The system of claim 1, wherein the one or more cooling components comprise an eductor.

6. The system of claim 1, wherein the one or more cooling components comprise:
one or more body portions that forms a passage for the at least the portion of the exhaust stream to pass through; and
one or more valves configured to:
block the cooling stream in the closed position; and
pass the cooling stream in the open position.

7. The system of claim 1, wherein the one or more cooling components comprise:
one or more body portions that forms a passage for the at least the portion of the exhaust stream to pass through; and
one or more dampers configured to:
block the cooling stream in the closed position; and
pass the cooling stream in the open position.

8. The system of claim 1, wherein the tempering air system further comprising one or more flow divert components disposed within the interior region and upstream of the one or more cooling components, each of the one or more flow divert components configured to divert the flow path of the at least the portion of the exhaust stream into the one or more cooling components.

9. The system of claim 1, wherein the tempering air system further comprising one or more mixing components disposed within the interior region and downstream of the one or more cooling components, each of the one or more mixing components configured to divert the flow path of the at least the portion of the exhaust stream to interact with the cooling stream.

10. The system of claim 9, wherein the one or more mixing components comprises one or more of a perforated sheet, a screen, a filter and any combination thereof.

11. The system of claim 1, wherein the exhaust treatment system is comprised of a catalyst, SCR, oxidation catalyst, NSCR or any combination thereof.

12. The system of claim 1, wherein a temperature of the mixed stream provided to the exhaust treatment system is in the range between 356.85° C. and 426.85° C.

13. The system of claim 1, wherein the each of the one or more cooling components rely solely on pressure differentials to draw the cooling stream.

14. The system of claim 1, wherein each of the one or more cooling components have an upstream cross sectional area of a flow passage through the cooling component that is smaller than a downstream cross sectional area of the flow passage as measured along the direction of the exhaust stream passing through the cooling component.

15. A process for removing contaminants from an exhaust stream, the process comprising:
a) passing at least a portion of an exhaust stream through a cooling component;
b) drawing a cooling stream into the cooling component based on the at least the portion of the exhaust stream passing through at least a portion of the cooling component, wherein drawing the cooling stream relies on the Venturi effect and/or Bernoulli's principle based on a velocity of the at least the portion of the exhaust stream;
c) mixing the cooling stream with the at least the portion of the exhaust stream to form a mixed stream, wherein a temperature of the mixed stream is less than a temperature of the at least the portion of the exhaust stream; and
d) passing the mixed stream to an exhaust treatment system to remove one or more contaminants from the mixed stream, and further comprising:
obtaining temperature measurements;
determining whether the temperature measurements are within a threshold; and
adjusting a volume of cooling stream drawn into the cooling component if the temperature measurements are not within the threshold;
wherein the obtaining temperature measurements comprises
measuring the temperature of the mixed stream upstream of the exhaust treatment system, or
measuring the temperature of the exhaust stream upstream of the cooling component.

16. The process of claim 15, further comprise combusting a feed stream in a turbine to produce the exhaust stream.

17. The process of claim 15, wherein the cooling stream is predominately atmospheric air.

18. The process of claim 15, wherein the drawing the cooling stream comprise passing the cooling stream through a valve associated with the cooling component.

19. The process of claim 15, wherein the drawing the cooling stream comprise passing the cooling stream through a damper associated with the cooling component.

20. The process of claim 15, further comprising diverting a flow path of the at least the portion of the exhaust stream into the cooling component.

21. The process of claim 15, further comprising diverting a flow path of the at least the portion of the exhaust stream to interact with the cooling stream.

22. The process of claim 15, wherein the temperature of the mixed stream provided to the exhaust treatment system is in the range between 356.85° C. and 426.85° C.

23. The process of claim 15, wherein the drawing the cooling stream relies solely on pressure differentials.

24. The process of claim 15, wherein the passing the at least the portion of the exhaust stream through the cooling component comprises passing the at least the portion of the exhaust stream through an upstream flow passage having an upstream cross sectional area and passing the at least the portion of the exhaust stream through a downstream flow passage having an downstream cross sectional area, wherein the upstream cross sectional area is smaller than a downstream cross sectional area as measured along the direction of the exhaust stream passing through the cooling component.

* * * * *